US009929636B2

(12) United States Patent
Shinomoto et al.

(10) Patent No.: US 9,929,636 B2
(45) Date of Patent: Mar. 27, 2018

(54) DC POWER-SUPPLY DEVICE, MOTOR DRIVE DEVICE INCLUDING THE SAME, AND REFRIGERATION-CYCLE APPLICATION DEVICE INCLUDING THE MOTOR DRIVE DEVICE

(71) Applicant: Mitsubishi Electric Corporation, Tokyo (JP)

(72) Inventors: Yosuke Shinomoto, Tokyo (JP); Kazunori Hatakeyama, Tokyo (JP); Shota Kamiya, Tokyo (JP); Keisuke Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/117,285

(22) PCT Filed: Feb. 19, 2014

(86) PCT No.: PCT/JP2014/053922
§ 371 (c)(1),
(2) Date: Aug. 8, 2016

(87) PCT Pub. No.: WO2015/125240
PCT Pub. Date: Aug. 27, 2015

(65) Prior Publication Data
US 2017/0016655 A1    Jan. 19, 2017

(51) Int. Cl.
*H02M 1/42* (2007.01)
*H02M 1/12* (2006.01)
(Continued)

(52) U.S. Cl.
CPC .............. *H02M 1/12* (2013.01); *H02M 1/42* (2013.01); *H02M 1/4216* (2013.01);
(Continued)

(58) Field of Classification Search
CPC ........ H02M 1/42; H02M 7/06; H02M 1/4225; H02M 1/4216; H02M 1/12
See application file for complete search history.

(56) References Cited

U.S. PATENT DOCUMENTS 5,345,375 A    9/1994  Mohan
5,430,639 A    7/1995  Takahashi
(Continued)

FOREIGN PATENT DOCUMENTS

CN    1183654 C    1/2005
CN    101680444 A    3/2010
(Continued)

OTHER PUBLICATIONS

International Search Report of the International Searching Authority dated Apr. 28, 2014 for the corresponding international application No. PCT/JP2014/053922 (and English translation).
(Continued)

*Primary Examiner* — Kyle J Moody
(74) *Attorney, Agent, or Firm* — Posz Law Group, PLC

(57) ABSTRACT

A first reactor is provided on the input side of a rectifying circuit that rectifies AC power (on the side of an AC power supply), and on the output side of the rectifying circuit (on the side of a load), first and second capacitors that are connected in series to each other, and first and second switching elements that switch between charging and not charging of the first and second capacitors, respectively, are provided, a second capacitor group in Y-connection, provided with three capacitors, each of which is connected to each phase-terminal of the first reactor on the side of the rectifying circuit, is connected to the midpoint of the first and second switching elements, and the output voltage to the load is boosted, while the on-duty of the first switching
(Continued)

element and the on-duty of the second switching element are controlled to be equal to each other.

10 Claims, 8 Drawing Sheets

(51) Int. Cl.
  *H02M 7/06* (2006.01)
  *H02P 27/08* (2006.01)
  *F25B 49/02* (2006.01)
(52) U.S. Cl.
  CPC .......... *H02M 1/4225* (2013.01); *H02M 7/06* (2013.01); *F25B 49/025* (2013.01); *F25B 2600/021* (2013.01); *H02P 27/08* (2013.01); *H02P 2201/09* (2013.01); *Y02B 30/741* (2013.01); *Y02B 70/126* (2013.01)

(56) References Cited

U.S. PATENT DOCUMENTS

| | | | |
|---|---|---|---|
| 5,499,178 A | 3/1996 | Mohan | |
| 5,654,882 A * | 8/1997 | Kanazawa | H02M 1/4216 363/37 |
| 5,719,757 A * | 2/1998 | Beyerlein | H02M 1/4216 323/211 |
| 5,933,336 A * | 8/1999 | Jiang | H02M 1/4216 363/44 |
| 6,181,583 B1 | 1/2001 | Okui et al. | |
| 6,850,426 B2 * | 2/2005 | Kojori | H02P 23/0004 363/123 |
| 7,005,759 B2 * | 2/2006 | Ying | H02J 9/061 307/110 |
| 8,325,501 B2 * | 12/2012 | Torrico-Bascope | H02M 1/4216 363/47 |
| 8,687,388 B2 * | 4/2014 | Jang | H02M 1/4216 363/44 |
| 8,891,261 B2 * | 11/2014 | Jang | H02M 1/4216 363/44 |
| 9,099,934 B2 * | 8/2015 | Swamy | H02M 1/4216 |
| 9,764,654 B2 * | 9/2017 | Malrieu | B60L 11/1851 |
| 2004/0160789 A1 | 8/2004 | Ying et al. | |
| 2007/0266720 A1 | 11/2007 | Matsui et al. | |
| 2010/0178175 A1 | 7/2010 | Koyama | |
| 2011/0019452 A1 | 1/2011 | Shinomoto et al. | |

FOREIGN PATENT DOCUMENTS

| | | |
|---|---|---|
| CN | 103066877 A | 4/2013 |
| JP | H06-253540 A | 9/1994 |
| JP | H11-168885 A | 6/1999 |
| JP | 2000-278955 A | 10/2000 |
| JP | 2001-145360 A | 5/2001 |
| JP | 2006-238621 A | 9/2006 |
| JP | 2008-012586 A | 1/2008 |
| JP | 2008-295228 A | 12/2008 |
| JP | 2009-050109 A | 3/2009 |
| JP | 2009-112172 A | 5/2009 |
| JP | 2012-079454 A | 4/2012 |
| JP | 2012-165539 A | 8/2012 |
| WO | 93/12576 A1 | 6/1993 |
| WO | 2004/071703 A1 | 8/2004 |
| WO | 2005/103584 A1 | 11/2005 |
| WO | 2009/028053 A1 | 3/2009 |

OTHER PUBLICATIONS

Office action dated Sep. 5, 2017 for the corresponding Japanese patent application No. 2016-503825.
Office Action dated Jan. 25, 2018 issued in corresponding CN patent application No. 201480075339.6 (and English machine translation thereof).
"Three Phase Partyl-Decoupled CCMPFC Converter Controlled by DSP" cited in the Jan. 25, 2018 Office Action issued in corresponding CN patent application No. 201480075339.6.

* cited by examiner

DC POWER-SUPPLY DEVICE, MOTOR DRIVE DEVICE INCLUDING THE SAME, AND REFRIGERATION-CYCLE APPLICATION DEVICE INCLUDING THE MOTOR DRIVE DEVICE

CROSS REFERENCE TO RELATED APPLICATION

This application is a U.S. national stage application of International Patent Application No. PCT/JP2014/053922 filed on Feb. 19, 2014, the disclosure of which is incorporated herein by reference.

TECHNICAL FIELD

The present invention relates to a DC power-supply device, a motor drive device including the same, and a refrigeration-cycle application device including the motor drive device.

BACKGROUND

There has been a conventional DC power-supply device, in which a rectifying circuit, connecting rectifying diodes in a full-bridge configuration, rectifies single-phase or three-phase AC commercial power, or the like, and a series-connected switching element group performs switching of the output of the rectifying circuit to store energy in a reactor provided at the previous stage or the subsequent stage of the rectifying circuit, and to charge a capacitor with this energy, which is connected in parallel to the switching element group, thereby supplying a boosted DC voltage to a load. In the DC power-supply device as described above, it is general to change the boost ratio by means of changing the switching, and changing the energy to be stored in the reactor. However, there is a problem that when the switching frequency is increased, a switching loss is increased.

To the problem as described above, a technique to change the boost ratio without changing the switching frequency has been disclosed in Patent Literature 1 listed below, for example. In this technique, in the case of decreasing the boost ratio, a first switching element and a second switching element are turned on/off simultaneously. Also, in the case of increasing the boost ratio, a state transition is repeated, in which the first switching element and the second switching element are turned on simultaneously, one of the switching elements is only turned on, the first and second switching elements are turned on simultaneously, and the other switching element is only turned on.

Patent Literatures 2 and 3 listed below disclose a technique to control an input current into a sine waveform. These Patent Literatures are mentioned later in the descriptions of the embodiments of the present invention.

PATENT LITERATURE

Patent Literature 1: Japanese Patent Application Laid-open No. 2009-50109
Patent Literature 2: Japanese Patent Application Laid-open No. H11-168885
Patent Literature 3: Japanese Patent Application Laid-open No. 2009-112172

In the technique in Patent Literature 1 mentioned above, a high boost ratio can be obtained without increasing the switching frequency. However, there is a problem that the switching control method needs to be changed according to whether the boost ratio is decreased or increased, which complicates the control.

SUMMARY

The present invention has been achieved to solve the above problems, and an object of the present invention is to provide a DC power-supply device that can more efficiently achieve a high boost ratio with an easier control, a motor drive device including the DC power-supply device, and a refrigeration-cycle application device including the motor drive device.

In order to solve the above-mentioned problems and achieve the object, according to an aspect of the present invention, there is provided a DC power-supply device that converts an alternating current supplied from an AC power supply to a direct current, and that supplies the direct current to a load, the DC power-supply device including: a rectifying circuit that rectifies the alternating current; a first reactor that is inserted between the AC power supply and the rectifying circuit for each phase; a first capacitor group that is provided with a first capacitor and a second capacitor connected in series to each other, and that is connected between output terminals to the load; a switching element group that is provided with a first switching element and a second switching element connected in series to each other, and that is connected in parallel to between the rectifying circuit and the first capacitor group; a backflow prevention unit that prevents a backflow of electric charge to the switching element group, where the electric charge is stored in the first capacitor group by an operation of the switching element group; a second capacitor group that is provided with three capacitors, in each of which one end is electrically connected to a midpoint of the switching element group, and the other end is connected to each phase-terminal of the first reactor on a side of the rectifying circuit; and a second reactor in which one end is connected to a connection point of the first reactor and the second capacitor group, and the other end is connected to the rectifying circuit, wherein the DC power-supply device boosts an output voltage to the load, while controlling an on-duty of the first switching element, and an on-duty of the second switching element to be equal to each other, and an inductance value of the second reactor is smaller than an inductance value of the first reactor.

According to the present invention, it is possible to more efficiently achieve a high boost ratio with an easier control.

DETAILED DESCRIPTION

Exemplary embodiments of a DC power-supply device, a motor drive device including the same, and a refrigeration-cycle application device including the motor drive device according to the present invention will be explained below in detail with reference to the accompanying drawings. The present invention is not limited to the embodiments.

First Embodiment

Figure 1:
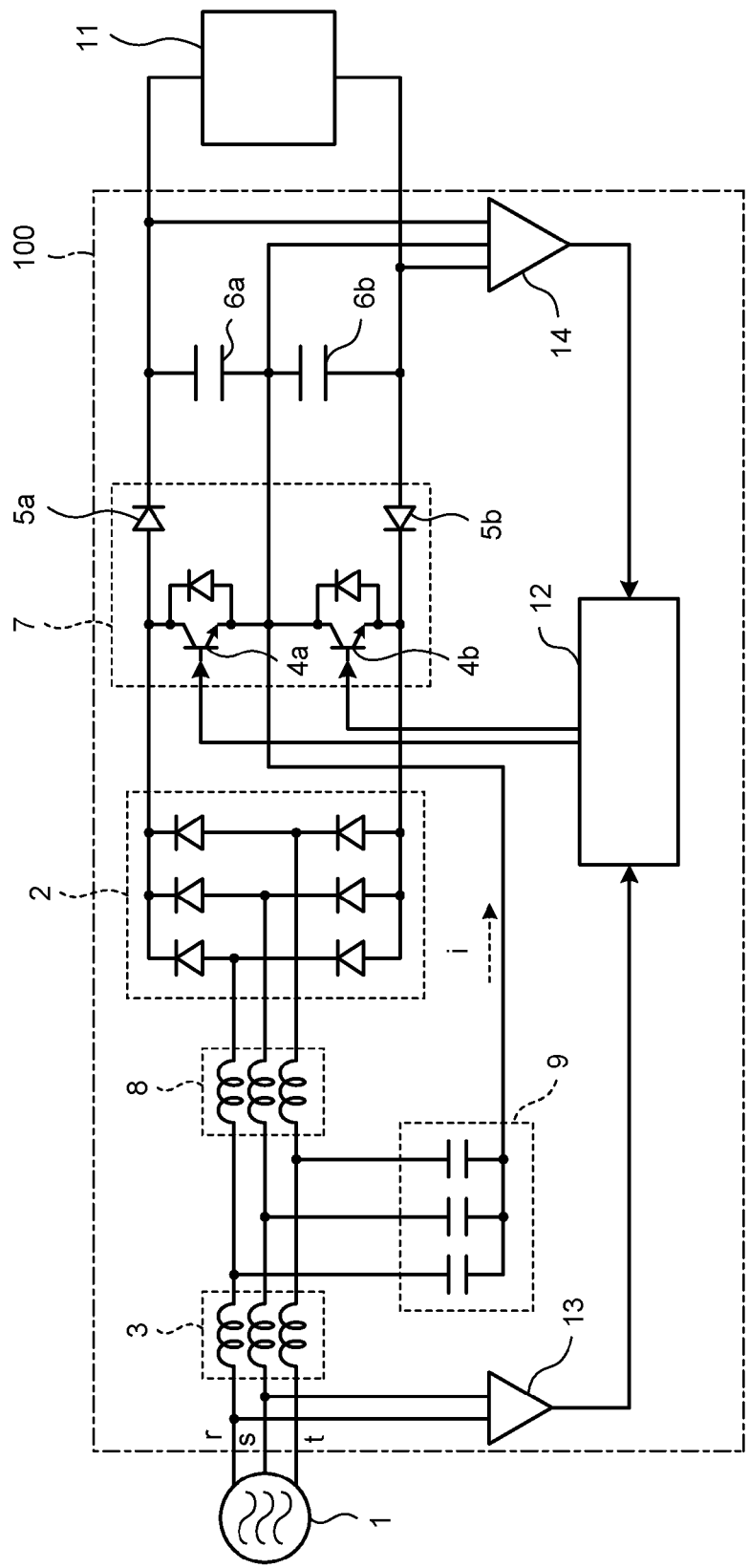
FIG. 1 is a diagram illustrating a configuration example of a DC power-supply device according to a first embodiment.

FIG. 1 is a diagram illustrating a configuration example of a DC power-supply device according to a first embodiment. As illustrated in FIG. 1, a DC power-supply device 100 according to the first embodiment is configured to convert a three-phase alternating current supplied from an AC power supply 1 to a direct current, and supply the direct current to a load 11 according to the operating state of the load 11. In the present embodiment, a load of an inverter that drives a motor of a compressor used in a refrigeration-cycle device is assumed as the load 11, for example. However, it is apparent that the load 11 is not limited thereto.

The DC power-supply device 100 includes a rectifying circuit 2 that rectifies a three-phase alternating current, a first reactor 3 on the side of the AC power supply 1, and a second reactor 8 on the side of the rectifying circuit 2, each of which is provided at the previous stage of the rectifying circuit 2, and is inserted between the AC power supply 1 and the rectifying circuit 2 for each phase of the three-phase alternating current, a first capacitor 6a and a second capacitor 6b that are connected in series to each other between the output terminals to the load 11, a first switching element 4a and a second switching element 4b that are connected in series to each other between the output terminals of the rectifying circuit 2, where the first switching element 4a serves as a first switching unit that switches between charging and not charging of the first capacitor 6a, and the second switching element 4b serves as a second switching unit that switches between charging and not charging of the second capacitor 6b, a first backflow prevention element 5a that serves as a first backflow prevention unit that prevents a backflow of electric charge stored in the first capacitor 6a to the first switching element 4a, a second backflow prevention element 5b that serves as a second backflow prevention unit that prevents a backflow of electric charge stored in the second capacitor 6b to the second switching element 4b, a capacitor group 9 in star connection (in Y-connection) such that one end is connected to each phase, and the other end is connected between the midpoint of the first switching element 4a and the second switching element 4b, and the midpoint of the first reactor 3 and the second reactor 8 for each phase, a power-supply voltage detection unit 13 that detects a voltage of the three-phase alternating current, a DC-voltage detection unit 14 that detects a DC voltage to be supplied to the load 11, and a control unit 12 that controls the first switching element 4a and the second switching element 4b. In the example illustrated in FIG. 1, the rectifying circuit 2 is configured as a three-phase full-wave rectifying circuit, in which six rectifying diodes are connected in a full-bridge configuration. Further, in the example illustrated in FIG. 1, the power-supply voltage detection unit 13 detects the line voltage between two phases (an r-phase and an s-phase in this example) of the three-phase alternating current supplied from the AC power supply 1.

The first switching element 4a and the second switching element 4b constitute a switching element group. The first backflow prevention element 5a and the second backflow prevention element 5b constitute a backflow prevention unit. Further, the first switching element 4a, the second switching element 4b, the first backflow prevention element 5a, and the second backflow prevention element 5b constitute a charging unit 7 that charges the first capacitor 6a and the second capacitor 6b. Furthermore, the first capacitor 6a and the second capacitor 6b constitute a first capacitor group. The capacitor group 9 constitutes a second capacitor group. The Y-connection terminals in the capacitor group 9 are not necessarily connected directly to the midpoint of the switching element group. It is also possible that the Y-connection terminals are configured to be electrically connected to the midpoint of the switching element group.

The first capacitor 6a and the second capacitor 6b which have the same capacitance are used. As the first switching element 4a and the second switching element 4b, a semiconductor element is used, such as a power transistor, a power MOSFET, or an IGBT.

The control unit 12 outputs respective PWM signals SW1 and SW2 according to the operating state of the load 11, and controls the first switching element 4a and the second switching element 4b to be on/off, thereby controlling the DC voltage to be supplied to the load 11. For example, in the case where the load 11 is a motor and an inverter that drives the motor, the operating state of the load 11 is a parameter represented as a rotational speed of the motor, or as an output voltage to be output to the inverter that drives the motor. It is also possible that the control unit 12 is configured to control this load 11, or another control unit (not illustrated) different from the control unit 12 is configured to control the load 11. In the case where the control unit 12 is configured to control the load 11, the control unit 12 is capable of identifying the operating state of the load 11. In the case where another control unit (not illustrated) different from the control unit 12 is configured to control the load 11, this different control unit notifies the control unit 12 of the operating state of the load 11, and then the control unit 12 is capable of identifying the operating state of the load 11. The present invention is not limited by the method for the control unit 12 to identify the operating state of the load 11.

Figure 2:
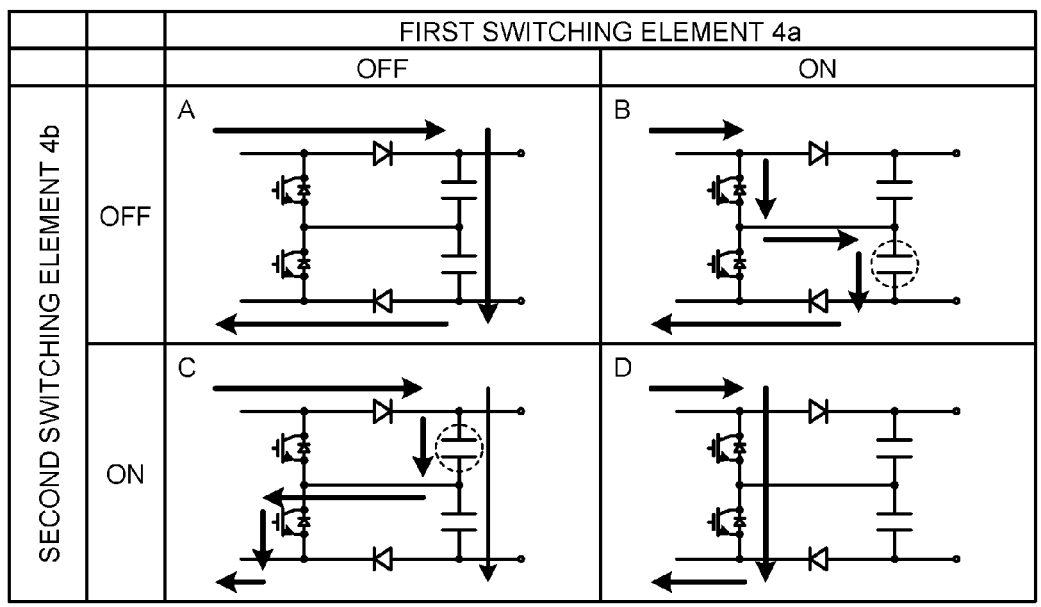
FIG. 2 is a diagram illustrating a switching control state in the DC power-supply device according to the first embodiment.
Figure 3:
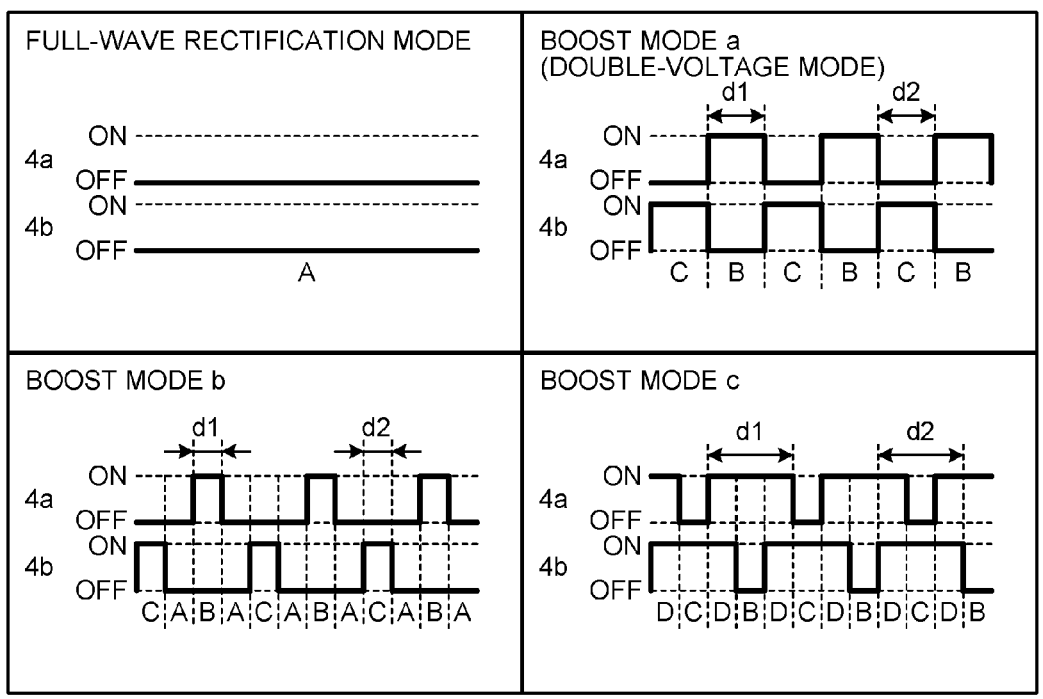
FIG. 3 is a diagram illustrating each operating mode of the DC power-supply device according to the first embodiment.

Next, a switching control to be executed on the first switching element 4a and the second switching element 4b by the control unit 12 is described with reference to FIGS. 1 to 3. FIG. 2 is a diagram illustrating a switching control state in the DC power-supply device according to the first embodiment. In the example illustrated in FIG. 2, the reference sign of each constituent element is omitted. FIG. 3 is a diagram illustrating each operating mode of the DC power-supply device according to the first embodiment.

First, with reference to FIG. 2, the switching control state of the first switching element 4a and the second switching element 4b is described.

A state A indicates that the first switching element 4a and the second switching element 4b are both controlled to an off state. In this state, the first capacitor 6a and the second capacitor 6b are charged.

A state B indicates that only the first switching element 4a is controlled to an on state. In this state, the second capacitor 6b is charged.

A state C indicates that only the second switching element 4b is controlled to an on state. In this state, the first capacitor 6a is charged.

A state D indicates a short-circuit state, in which two switching elements 4a and 4b are both controlled to be on. In this state, basically both the first capacitor 6a and the second capacitor 6b are not charged.

According to the operating state of the load 11, the control unit 12 appropriately switches between the respective states illustrated in FIG. 2 thereby controlling the DC voltage to be supplied to the load 11.

Next, the operating mode of the DC power-supply device 100 according to the first embodiment is described with reference to FIG. 3.

As illustrated in FIG. 3, as the operating mode of the DC power-supply device 100 according to the first embodiment, the DC power-supply device 100 has a full-wave rectification mode, in which the first switching element 4a and the second switching element 4b are controlled to a normally off state, and three boost modes, in which the first switching element 4a and the second switching element 4b are alternately controlled to be on.

These boost modes are a boost mode "a" (a double-voltage mode), a boost mode "b", and a boost mode "c". In the boost mode "a", the on-duty of the first switching element 4a and the second switching element 4b (also referred to as "time ratio" that is the ratio of time, during which each switching element is turned on, relative to the switching cycle) is 50%. In the boost mode "b", the on-duty of the first switching element 4a and the second switching element 4b is less than 50%. In the boost mode "c", the on-duty of the first switching element 4a and the second switching element 4b is greater than 50%.

In the full-wave rectification mode, the first switching element 4a and the second switching element 4b are controlled to a normally off state. Therefore, a voltage that is full-wave rectified by the rectifying circuit 2 is an output voltage.

In the boost mode "a" (the double-voltage mode), the first switching element 4a is turned on and the second switching element 4b is turned off almost at the same timing. Also, the first switching element 4a is turned off and the second switching element 4b is turned on almost at the same timing. The state B and the state C illustrated in FIG. 2 are repeated. At this time, the output voltage is substantially twice as high as the output voltage in the full-wave rectification mode. When the first switching element 4a and the second switching element 4b are turned on simultaneously, a short-circuit current flows through these switching elements in practice. Therefore, it is desirable to set several microseconds of dead time.

In the boost mode "b", a simultaneous off period is set, during which the first switching element 4a and the second switching element 4b are both turned off. At this time, a state transition C→A→B→A illustrated in FIG. 2 is periodically repeated. The output voltage at this time is an intermediate voltage between the output voltage in the full-wave rectification mode and the output voltage in the boost mode "a" (the double-voltage mode).

In the boost mode "c", a simultaneous on period is set, during which the first switching element 4a and the second switching element 4b are both turned on. At this time, a state transition D→C→D→B illustrated in FIG. 2 is periodically repeated. During this simultaneous on period (during the period of the state D in this example), energy is stored in the first reactor 3 and the second reactor 8. At this time, the output voltage becomes equal to or higher than the output voltage in the boost mode "a" (the double-voltage mode).

Therefore, the magnitude relation between the output voltages in the respective modes is expressed as full-wave rectification mode<boost mode "b"<boost mode "a" (double-voltage mode)<boost mode "c".

As described above, in the present embodiment, it is possible to control the DC voltage to be supplied to the load 11 by means of changing the on-duty of the first switching element 4a and the second switching element 4b. According to the operating state of the load 11, the control unit 12 changes the on-duty of the first switching element 4a and the second switching element 4b, thereby shifting the operating mode between the full-wave rectification mode, the boost mode "b", the boost mode "a" (the double-voltage mode), and the boost mode "c", and outputting a desired output voltage to the load 11.

Further, in the present embodiment, as illustrated in FIG. 3, the control unit 12 executes control such that an on-duty d1 of the first switching element 4a matches an on-duty d2 of the second switching element 4b in each of the boost modes "a", "b", and "c" (d1=d2). Due to this control, the processing load on the control unit 12 can be reduced, and therefore the control unit 12 can be implemented by a general low-cost microcomputer. This also facilitates incorporating of the functions of the control unit 12 into a control unit (not illustrated) that controls the load 11.

That is, in the DC power-supply device 100 according to the present embodiment, by matching the on-duty of the first switching element 4a and the on-duty of the second switching element 4b, and also changing this on-duty, a DC voltage twice as high as the power-supply voltage, or even higher can be obtained easily with a low-cost configuration.

Next, the operation of the DC power-supply device 100 according to the first embodiment in each boost mode is described with reference to FIGS. 1 to 4.

In the present embodiment, as illustrated in FIG. 1, the DC power-supply device 100 is provided with the power-supply voltage detection unit 13 that detects a three-phase AC voltage, and the DC-voltage detection unit 14 that detects a DC voltage to be supplied to the load 11. In the example illustrated in FIG. 1, the power-supply voltage detection unit 13 is configured to detect the line voltage between the r-phase and the s-phase of the three-phase alternating current. However, it is also possible that the power-supply voltage detection unit 13 is configured to detect the line voltage between the s-phase and the t-phase, or between the t-phase and the r-phase, or is configured to detect each phase voltage. The present invention is not limited by the configuration of this power-supply voltage detection unit 13.

The control unit 12 changes the on-duty of the first switching element 4a and the second switching element 4b in each boost mode according to the detected voltage value of the three-phase AC obtained from the detection result of the power-supply voltage detection unit 13.

The control unit 12 holds the three-phase AC reference voltage value as a threshold value, such that at this reference voltage value, the DC power-supply device 100 is operated in the boost mode "a" (the double-voltage mode), in which the on-duty of the first switching element 4a and the second switching element 4b illustrated in FIG. 3 is 50%, for example. When the detected voltage value is smaller than the reference voltage value, the DC power-supply device 100 is operated in the boost mode "c", in which the on-duty of the first switching element 4a and the second switching element 4b is equal to or greater than 50%. When the detected voltage value is greater than the reference voltage value, the DC power-supply device 100 is operated in the boost mode "b", in which the on-duty of the first switching element 4a and the second switching element 4b is less than 50%.

For another example, it is also possible that the control unit 12 holds a table of the on-duty of the first switching element 4a and the second switching element 4b such that the output voltage is constant with respect to the detected voltage value of the three-phase AC, and applies the on-duty of the first switching element 4a and the second switching element 4b according to the detected voltage value of the three-phase AC.

With the configuration as described above, the variations in three-phase AC voltage can be absorbed, and therefore the output voltage to the load 11 can be stabilized.

Figure 4:
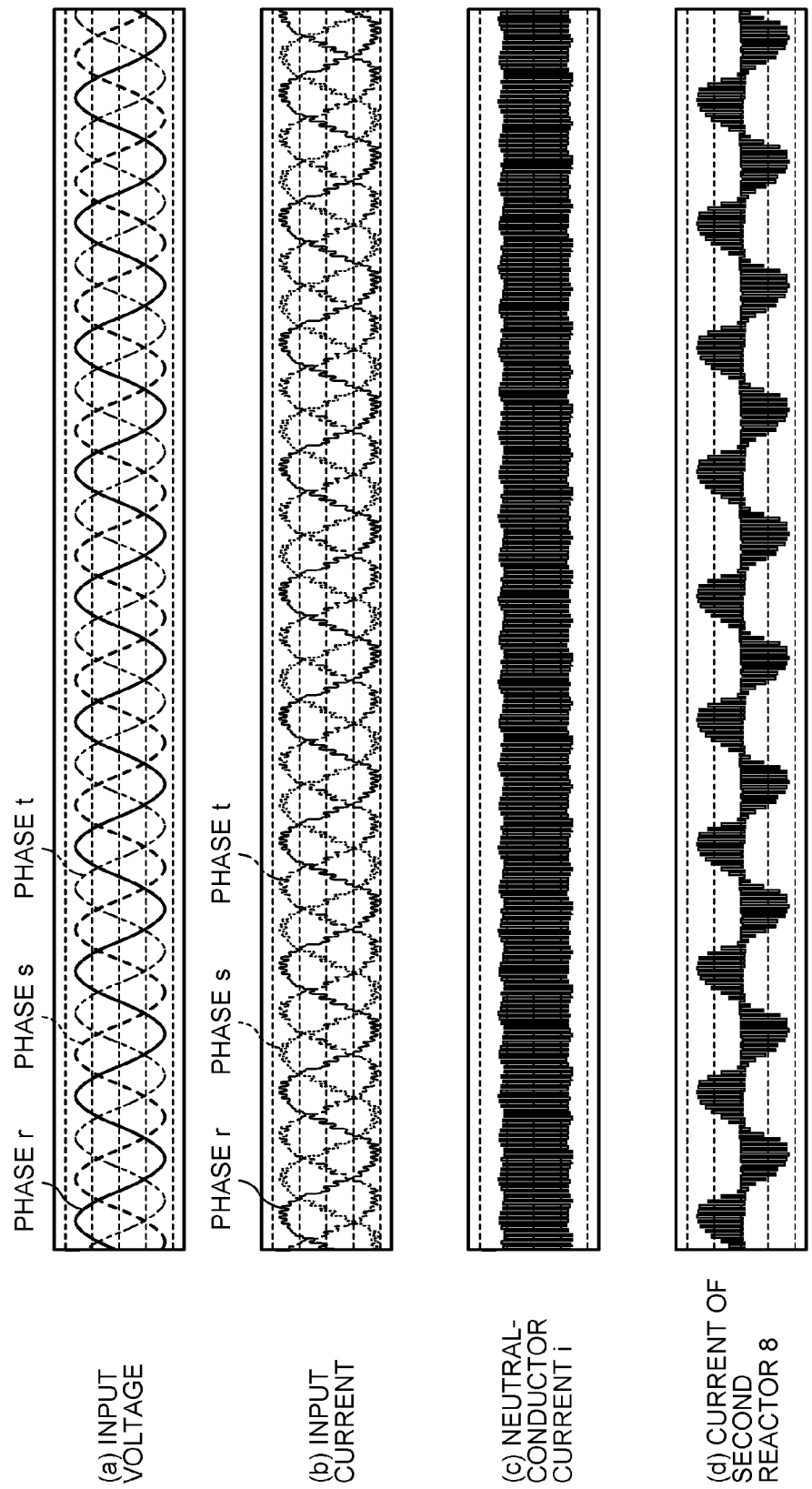
FIG. 4 are diagrams illustrating a waveform of each section when the DC power-supply device according to the first embodiment executes a high-frequency switching control.

In the present embodiment, the DC power-supply device 100 executes a high-frequency switching control, in which the first switching element 4a and the second switching element 4b are controlled to be on/off at a switching frequency higher than the power-supply frequency of the AC power supply 1. FIG. 4 are diagrams illustrating a waveform of each section when the DC power-supply device according to the first embodiment executes a high-frequency switching control. FIG. 4(a) illustrates an input-voltage waveform from the AC power supply 1. FIG. 4(b) illustrates an input-current waveform from the AC power supply 1. FIG. 4(c) illustrates a waveform of a neutral-conductor current "i" in which its positive flow direction is from the capacitor group 9 toward the midpoint of the series circuit consisting of the first switching element 4a and the second switching element 4b. FIG. 4(d) illustrates a waveform of a current that flows through the second reactor 8 of the r-phase.

When the second switching element 4b is controlled to be on, a positive neutral-conductor current "i" flows through the capacitor group 9, the second switching element 4b, the rectifying circuit 2, and the second reactor 8. In a phase in which the input voltage has a positive polarity, the current (the input current) that flows through the first reactor 3 is increased because the neutral-conductor current "i" is supplied from the side of the AC power supply 1, and then flows into the capacitor group 9. In contrast, in a phase in which the input voltage has a negative polarity, the input current is decreased because the neutral-conductor current "i" flows from the second reactor 8 into the capacitor group 9, and therefore does not flow out to the side of the AC power supply 1.

Further, when the first switching element 4a is controlled to be on, a negative neutral-conductor current "i" flows through the second reactor 8, the rectifying circuit 2, the first switching element 4a, and the capacitor group 9. In a phase in which the input voltage has a positive polarity, the current (the input current) that flows through the first reactor 3 is decreased because the neutral-conductor current "i" flows from the capacitor group 9 to the second reactor 8. In contrast, in a phase in which the input voltage has a negative polarity, the input current is increased because the neutral-conductor current "i" flows out from the capacitor group 9 to the AC power supply 1.

The switching operations described above are summarized in the following table.

TABLE 1

|  | Input current | |
| --- | --- | --- |
|  | Positive | Negative |
| First switching element 4a = ON | Decrease | Increase |
| Second switching element 4b = ON | Increase | Decrease |

As described above, the increase and decrease in input current for each phase can be controlled by controlling the first switching element 4a and the second switching element 4b to be on/off alternately. Therefore, the input current flows according to the input voltage for each phase. In the case where the AC power supply 1 is a three-phase AC power supply, the input currents that respectively flow through the three phases are balanced, and accordingly the DC power-supply device is capable of operating in a stable manner. The term "alternately" does not always mean that when one switching element (the first switching element 4a, for example) is controlled to be on, the other switching element (the second switching element 4b, for example) needs to be off. It is permissible that there is a period during which the switching elements are simultaneously turned on. For example, it suffices that the first switching element 4a and the second switching element 4b are controlled at the same on-duty (including substantially the same on-duty), and additionally there is a time slot in which when one switching element is controlled to be on, the other switching element is controlled to be off as the periods B and C in the boost mode "c" illustrated in FIG. 3. The same applies to the following descriptions.

Next, the reasons why it is possible to control the input current into a sine waveform are described. The DC power-supply device 100 of the present application includes the first reactor 3 and the second reactor 8. To their connection point, the capacitor group 9 is connected. When the inductance value (L8) of the second reactor 8 is set smaller than the inductance value (L3) of the first reactor 3 (that is, L3>L8), a current can flow through the second reactor 8 in a discontinuous mode. It is sufficient to set L3>L8, and therefore even where L8=0 is established, that is, even when the DC power-supply device 100 does not include a second reactor, it still functions as a DC power-supply device that boosts the voltage, although some degree of distortion appears in the input current waveform. In this sense, an embodiment, in which the DC power-supply device does not include a second reactor, also constitutes the scope of the present embodiment. However, it is apparent that parasitic inductance components attributable to the wiring or the like are present in practice.

When a current flows in a discontinuous mode, the current peak is so high that a significant amount of noise is emitted to the AC power supply 1. However, because the first reactor 3 is located in front of the connection point with the AC power supply 1, the impedance can be increased at the first reactor 3. When the switching is performed in a discontinuous mode, the current has the same waveform as that of the AC power supply 1, and the waveform can be improved to a sine waveform. Because the DC power-supply device 100 is provided with the first reactor 3 in front of the connection point with the AC power supply 1, an input current with a continuous sine waveform flows due to the current rectification effect of the first reactor 3. FIG. 4 are waveform diagrams of the analysis results. It can be also understood from FIG. 4 that a discontinuous-mode current (d) in the second reactor 8 has been improved to a sine waveform with a continuous shape in the input current (b).

As described above, the waveform of all the three-phase input currents can be improved to a sine waveform by only turning on/off the first switching element 4a and the second switching element 4b alternately. Therefore, power-factor improvement and harmonic-current suppression can both be achieved. Further, because the waveform of an input current can be improved to a sine waveform, a harmonic current can be greatly reduced, and suppressed to a state where the harmonic current is very close to zero. The power factor of the power supply can be also improved to approximately 100%.

When the first switching element 4a and the second switching element 4b are controlled to be on/off alternately, a current flows through the second reactor 8 in a discontinuous mode, and a combined current of the second reactor 8 for each phase is output from the rectifying circuit 2. Not only this current becomes a neutral-conductor current through the first switching element 4a or the second switching element 4b, but also this current is charged into the capacitors 6a and 6b through the backflow prevention elements 5a and 5b, respectively.

The midpoint of the first capacitor 6a and the second capacitor 6b, and the midpoint of the first switching element 4a and the second switching element 4b are at equal potential. This potential is also equal to the potential at the connection point of the capacitor group 9. Therefore, the voltage is changed with ripples in the carrier cycle. With this voltage change, the first capacitor 6a and the second capacitor 6b are charged. Accordingly, the electric charge is replenished in the first capacitor 6a and the second capacitor 6b per carrier cycle. Consequently, based on the double voltage rectification, the amount of charge to the capacitor is increased by high-frequency switching in a discontinuous mode. DC-voltage boosting can be thus achieved.

In a general high-frequency switching DC power-supply device, the DC voltage is boosted by a factor of "power-supply-voltage effective value" $\times\sqrt{2}\times 1.3$ to 1.4. In the DC power-supply device of the present application, based on the double voltage rectification, the DC voltage is boosted by a factor of "power-supply-voltage effective value" $\times 2\times\sqrt{2}\times 1.3$ to 1.4 by solely turning on/off two switching elements. The voltage boosting can be achieved twice as much as the general technique.

In the manner as described above, the DC voltage can be boosted twice as high as the power-supply voltage under the condition with the same switching loss as the general DC power-supply device. Assuming that the voltage is boosted to the same level as the general DC power-supply device, the DC power-supply device of the present application is capable of boosting the voltage at a lower loss than the conventional technique in which the switching elements are alternately turned on/off by general high-frequency switching (for example, Patent Literature 2 and Patent Literature 3).

It is obvious that by adjusting the duty cycle for turning the switching elements on/off alternately, the DC power-supply device of the present application can adjust the voltage to be boosted. Furthermore, based on the double voltage, the DC power-supply device of the present application can widely control the adjustment range of the voltage to be boosted. Because the DC power-supply device of the present application turns on/off the switching elements alternately at a high frequency, the first capacitor 6a and the second capacitor 6b are charged at a high frequency, and therefore their capacitance can be reduced. The first capacitor 6a and the second capacitor 6b can be implemented by downsized capacitors.

As described above, in the DC power-supply device according to the first embodiment, a first reactor is provided on the input side of a rectifying circuit that rectifies AC power (on the power-supply side), and on the output side of the rectifying circuit (on the load side), a first capacitor and a second capacitor that are connected in series to each other, and a first switching element and a second switching element that switch between charging and not charging of the first capacitor and the second capacitor, respectively, are provided. In this configuration, a second capacitor group in Y-connection, provided with three capacitors, each of which is connected to each phase-terminal of the first reactor on the side of the rectifying circuit, is connected to the midpoint of the first switching element and the second switching element, and the output voltage to the load is boosted, while the on-duty of the first switching element, and the on-duty of the second switching element are controlled to be equal to each other. Therefore, even when a DC voltage twice as high as the power-supply voltage, or even higher is obtained, the input-current waveform for each phase can still be shaped into a sine waveform easily with a low-cost configuration. Accordingly, it is possible to improve the power factor of the power supply, and decrease a harmonic current.

Further, the DC power-supply device can be operated at a higher boost ratio by easily controlling the on-duty without complicating the switching control. Even when the DC power-supply device is operated at a higher boost ratio, a switching loss can still be suppressed. Therefore, it is possible to achieve high efficiency.

Furthermore, it is possible to expand the adjustment range of the output voltage by changing the on-duty of the first switching unit and the second switching unit. Furthermore, it is possible to achieve a reduction in capacitance of the first capacitor and the second capacitor by executing a high-frequency switching control.

Second Embodiment

Figure 5:
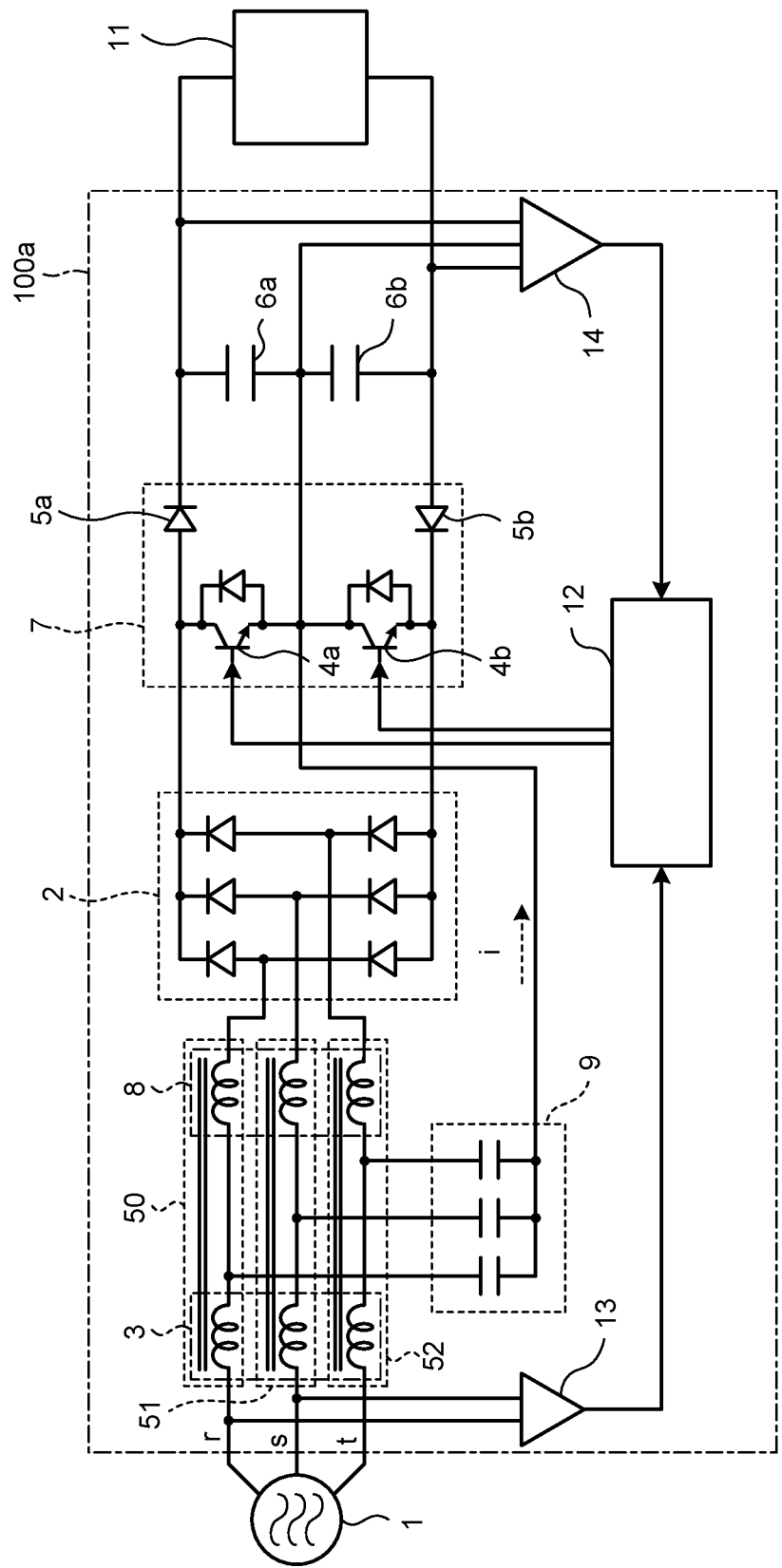
FIG. 5 is a diagram illustrating a configuration example of a DC power-supply device according to a second embodiment.

FIG. 5 is a diagram illustrating a configuration example of a DC power-supply device according to a second embodiment. Constituent elements identical or equivalent to those in the first embodiment are denoted by like reference signs and detailed descriptions thereof will be omitted.

In a DC power-supply device 100a according to the present embodiment illustrated in FIG. 5, the first reactor 3 and the second reactor 8 in the configuration illustrated in FIG. 1 and described in the first embodiment are magnetically coupled together to form a magnetically-coupled reactor. Reactors 50, 51, and 52 that are provided for the respective phases are configured as the magnetically-coupled reactors.

Due to the configuration as described above, the spatial volume of the reactors can be reduced in configuring the DC power-supply device 100a. Particularly, in the form of providing a center tap that is connected from the reactors 50, 51, and 52 to the capacitor group 9, the reactors 50, 51, and 52 can be configured as a single component structurally. Accordingly, it is possible to achieve spatial volumetric efficiency. Further, the same magnetically-coupled reactors for three phases are used, and therefore at the time of manufacturing the device, a cost reduction can be expected due to an increased number of the same reactors used.

As described in the first embodiment, it is necessary to set the inductance value of the second reactor 8 smaller than the inductance value of the first reactor 3. Specifically, upon performing high-frequency switching, the second reactor 8 needs to pass a discontinuous-mode current including many harmonic components, that is, many noise components. The first reactor 3 filters the noise components so as to shape the input current into a continuous sine waveform, and therefore needs dependency of the inductance capacitance on the current. Accordingly, a core material with high frequency characteristics is preferable as a core material of the second reactor 8. Also, a core material with a high magnetic density is preferable as a core material of the first reactor 3.

As described above, the first reactor 3 and the second reactor 8 are made of different core materials, and are magnetically coupled together. Therefore, DC components of the currents that flow respectively through the reactors 3 and 8 can be cancelled each other out, and DC excitation is cancelled. Accordingly, current saturation can be suppressed. Due to this configuration, the magnetically coupled reactors of the first reactor 3 and the second reactor 8 can achieve higher spatial volumetric efficiency than that of the simple magnetically-coupled reactors that share the iron core.

As described above, in the DC power-supply device according to the second embodiment, a first reactor and a second reactor for each phase are configured by a single magnetically-coupled reactor, thereby reducing the spatial volume of the reactor in configuring the DC power-supply device. Further, the same magnetically-coupled reactors for three phases are used, and therefore at the time of manufacturing the device, a cost reduction can be expected due to an increased number of the same reactors used.

Furthermore, the first reactor and the second reactor are made of different core materials, and magnetically coupled together. Therefore, the DC components of the currents that flow respectively through the reactors are cancelled each other out, and DC excitation is cancelled. Accordingly, current saturation can be suppressed. Consequently, the magnetically coupled reactors of the first reactor and the second reactor can achieve higher spatial volumetric efficiency than that of the simple magnetically-coupled reactors that share the iron core.

Third Embodiment

Figure 6:
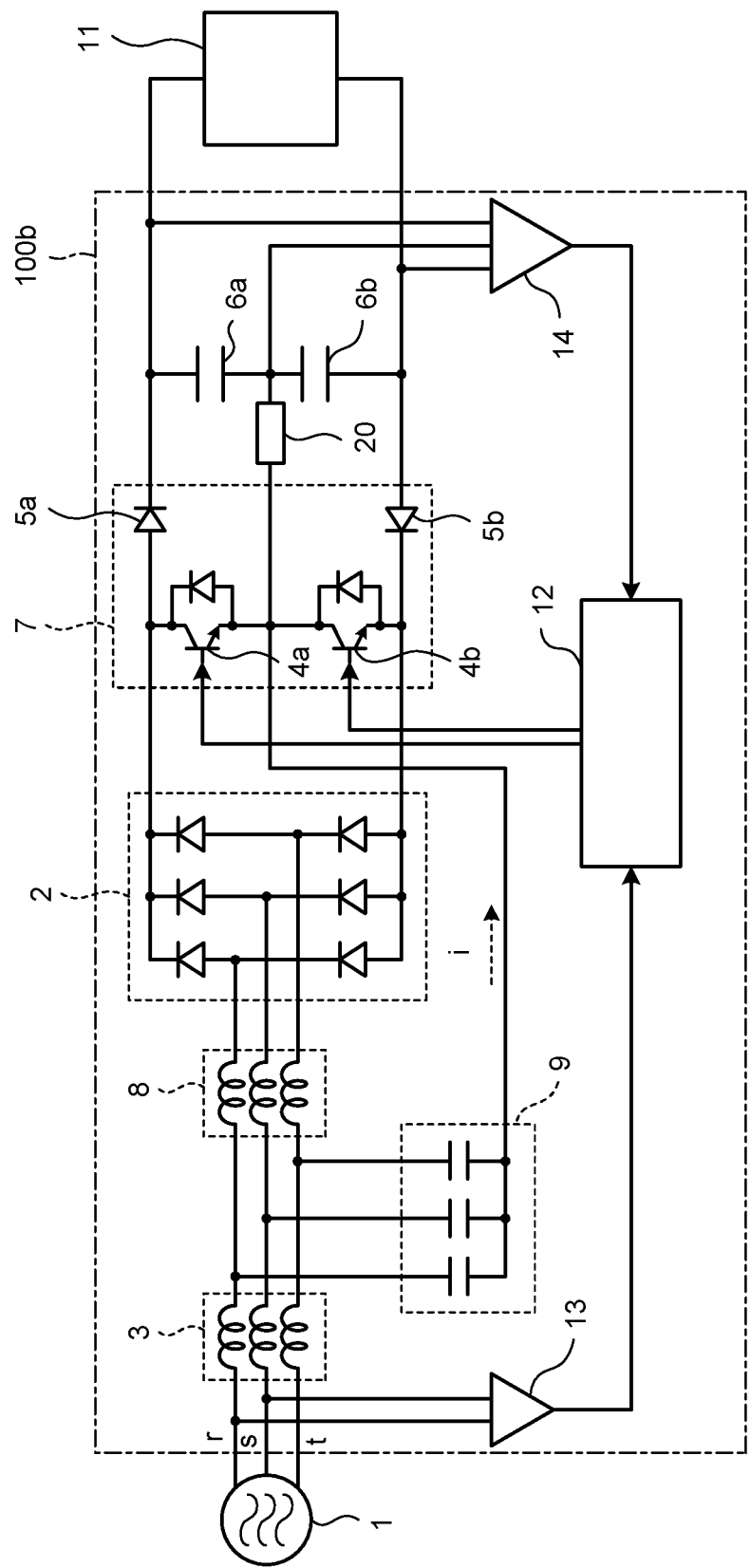
FIG. 6 is a diagram illustrating a configuration example of a DC power-supply device according to a third embodiment.

FIG. 6 is a diagram illustrating a configuration example of a DC power-supply device according to a third embodiment. Constituent elements identical or equivalent to those in the first embodiment are denoted by like reference signs and detailed descriptions thereof will be omitted.

As illustrated in FIG. 6, in a DC power-supply device 100b according to the third embodiment, in addition to the configuration illustrated in FIG. 1 and described in the first embodiment, the midpoint of the series circuit consisting of the first switching element 4a and the second switching element 4b, and the midpoint of the series circuit consisting of the first capacitor 6a and the second capacitor 6b, are connected to each other through an opening-closing unit 20 that is a neutral-conductor disconnection unit.

In the configuration of the first and second embodiments in which the opening-closing unit 20 is not included, when the DC power-supply device continues the operation in a state where a fault has occurred in any of the first backflow prevention element 5a, the second backflow prevention element 5b, the first switching element 4a, and the second switching element 4b, voltage unbalance between the first capacitor 6a and the second capacitor 6b is caused and the voltage of the first capacitor 6a and the second capacitor 6b may exceed their withstand voltage, resulting in a secondary fault. In order to prevent the secondary fault as described above, it is necessary to stop the operation of the device connected as the load 11 to the DC power-supply device.

In the present embodiment, the DC power-supply device 100b is provided with the opening-closing unit 20. Therefore, in a case where a short-circuit fault has occurred in any of the first backflow prevention element 5a, the second backflow prevention element 5b, the first switching element 4a, and the second switching element 4b, the opening-closing unit 20 is controlled to be opened, and also the DC power-supply device 100b is operated in the full-wave rectification mode. This makes it possible to supply power to the load 11 in a stable manner without causing voltage unbalance between the first capacitor 6a and the second capacitor 6b. It is also possible to continue the operation of the device connected as the load 11 to the DC power-supply device 100b.

In the example in FIG. 6, the configuration is illustrated, in which the opening-closing unit 20 is added to the configuration in FIG. 1 described in the first embodiment. However, apparently, it is possible to add the opening-closing unit 20 to the configuration in FIG. 5 described in the second embodiment.

As described above, in the DC power-supply device according to the third embodiment, the midpoint of a series circuit consisting of a first switching element and a second switching element, and the midpoint of a series circuit consisting of a first capacitor and a second capacitor, are connected to each other through an opening-closing unit. Therefore, in a case where a short-circuit fault has occurred in any of a first backflow prevention element, a second backflow prevention element, the first switching element, and the second switching element, the opening-closing unit is controlled to be opened, and also the DC power-supply device is operated in the full-wave rectification mode. This makes it possible to continue the operation of the DC power-supply device without causing voltage unbalance between the first capacitor and the second capacitor, and without causing a stop of the device connected as a load to the DC power-supply device. Accordingly, it is possible to obtain a highly-reliable DC power-supply device.

Fourth Embodiment

In a fourth embodiment of the present invention, there is described a load to be connected to the DC power-supply device described in the first and third embodiments.

Figure 7:
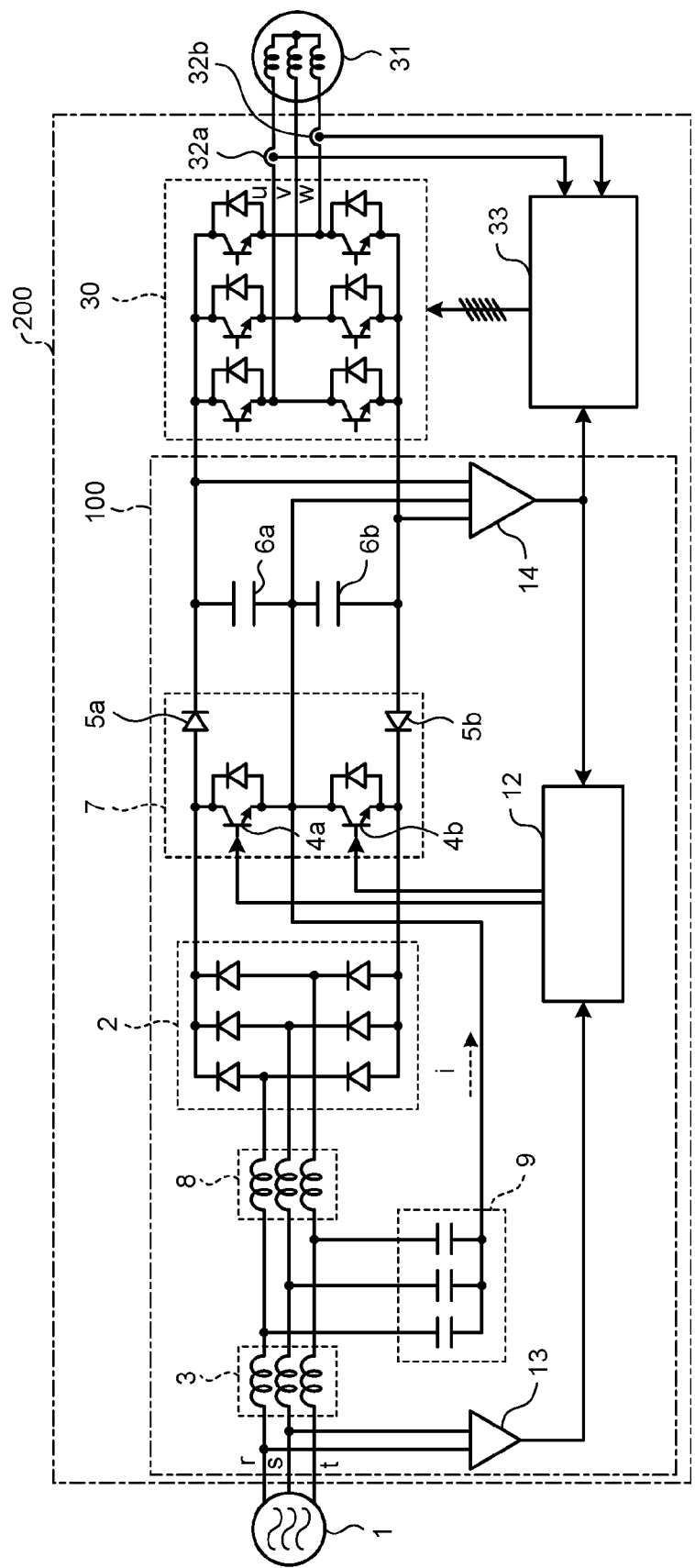
FIG. 7 is a diagram illustrating a configuration example of a motor drive device according to a fourth embodiment, to which an inverter that drives a motor is connected as a load of a DC power-supply device.

FIG. 7 is a diagram illustrating a configuration example of a motor drive device according to the fourth embodiment, to which an inverter that drives a motor is connected as a load of the DC power-supply device. Because the configuration of the DC power-supply device 100 illustrated in FIG. 7 is identical to that in the first embodiment, descriptions thereof will be omitted.

In the example illustrated in FIG. 7, a motor 31 is a three-phase motor that includes stator windings for three phases that are a u-phase, a v-phase, and a w-phase, and that uses a permanent magnet for a rotor. In addition to the configuration of the DC power-supply device 100 described in FIG. 1 in the first embodiment, a motor drive device 200 includes an inverter 30 that converts a DC voltage output from the DC power-supply device 100 to a three-phase AC voltage to drive the motor 31, current detection units 32a and 32b, each of which detects a current that flows to the motor 31, and a control unit 33 that controls the inverter 30 based on the detection result of the DC-voltage detection unit 14, and the detection results of the current detection units 32a and 32b. In the example illustrated in FIG. 7, the current detection units 32a and 32b are configured to respectively detect a u-phase current and a w-phase current that flow to the motor 31, and the control unit 33 is configured to obtain a v-phase current from the u-phase current and the w-phase current respectively detected by the current detection units 32a and 32b. However, it is apparent that the method for obtaining each phase-current is not limited thereto.

In the motor 31, the rotor rotates, and then a magnetic flux of the permanent magnet links with the stator winding, thereby generating an induced voltage. The motor 31 outputs a torque in proportion to the current that flows through the stator winding due to a difference in potential between this induced voltage and the voltage output from the inverter 30. This output torque of the motor 31 is proportional to the value of multiplication of the current that flows through the stator winding, and the number of turns of the stator winding. Therefore, the output torque of the motor 31 can be increased by increasing each phase-current output from the inverter 30. However, in this case, a copper loss in the motor 31, and a conduction loss in the inverter 30 are increased, which becomes a cause of hindering the achievement of high efficiency.

Meanwhile, the output torque of the motor 31 can be also increased by increasing the number of turns of the stator winding. However, in this case, it is necessary to boost the voltage to be output from the inverter 30 in order to equalize the currents that flow through the stator windings.

The motor drive device according to the present embodiment uses the DC power-supply device 100 described in the first embodiment to shift the operating mode between the full-wave rectification mode, the boost mode "b", the boost mode "a" (the double-voltage mode), and the boost mode "c", and therefore can widely adjust the output voltage to the inverter 30. That is, by boosting the output voltage to the inverter 30, the voltage to be output from the inverter 30 can be boosted. Therefore, by increasing the number of turns of the stator winding in the motor 31, the output torque of the motor 31 can be increased without increasing each phase-current to be output from the inverter 30, that is, without increasing a copper loss in the motor 31 and a conduction loss in the inverter 30. This can contribute to high efficiency.

In the case where the number of turns of the stator winding in the motor 31 is not increased, the output voltage to the inverter 30 is boosted, and then each phase voltage to be output from the inverter 30 is boosted, thereby increasing each phase-current to be output by the inverter 30. In this case, the output torque of the motor 31 can be increased without increasing the size of the motor 31. This can contribute to downsizing of the motor.

Further, using the DC power-supply device 100 described in the first embodiment makes it possible to achieve effects identical to those in the first embodiment, that is, improvement in power factor of the power supply, a decrease in harmonic current, high efficiency, and a reduction in capacitance of the first capacitor 6a and the second capacitor 6b.

As a permanent magnet used in the motor 31, a rare-earth magnet of neodymium (Nd), dysprosium (Dy) or the like, or a ferrite magnet, or the like is used. The rare-earth magnet has a greater magnetic force than the ferrite magnet. A motor using the rare-earth magnet as described above generates a torque at a low current, and is therefore more advantageous to achieve energy saving. However, because it is difficult to obtain rare metal referred to as "rare earth", the rare-earth magnet is more costly than the ferrite magnet. Accordingly, a motor using a magnet with increased availability, such as a ferrite magnet, has been recently desired. A motor using the ferrite magnet generates a lower torque than a motor using the rare-earth magnet, and therefore has problems of decreased efficiency and a decreased demagnetization resistance. However, the DC power-supply device 100 described in the first embodiment is used to boost the output voltage to the inverter 30, and the number of turns of the stator winding in the motor 31 is increased, so that the output torque of the motor 31 can be increased, and also the efficiency and the demagnetization resistance can be improved. Therefore, this facilitates use of a ferrite magnet that has increased availability and is less costly as compared to a rare-earth magnet.

Figure 8:
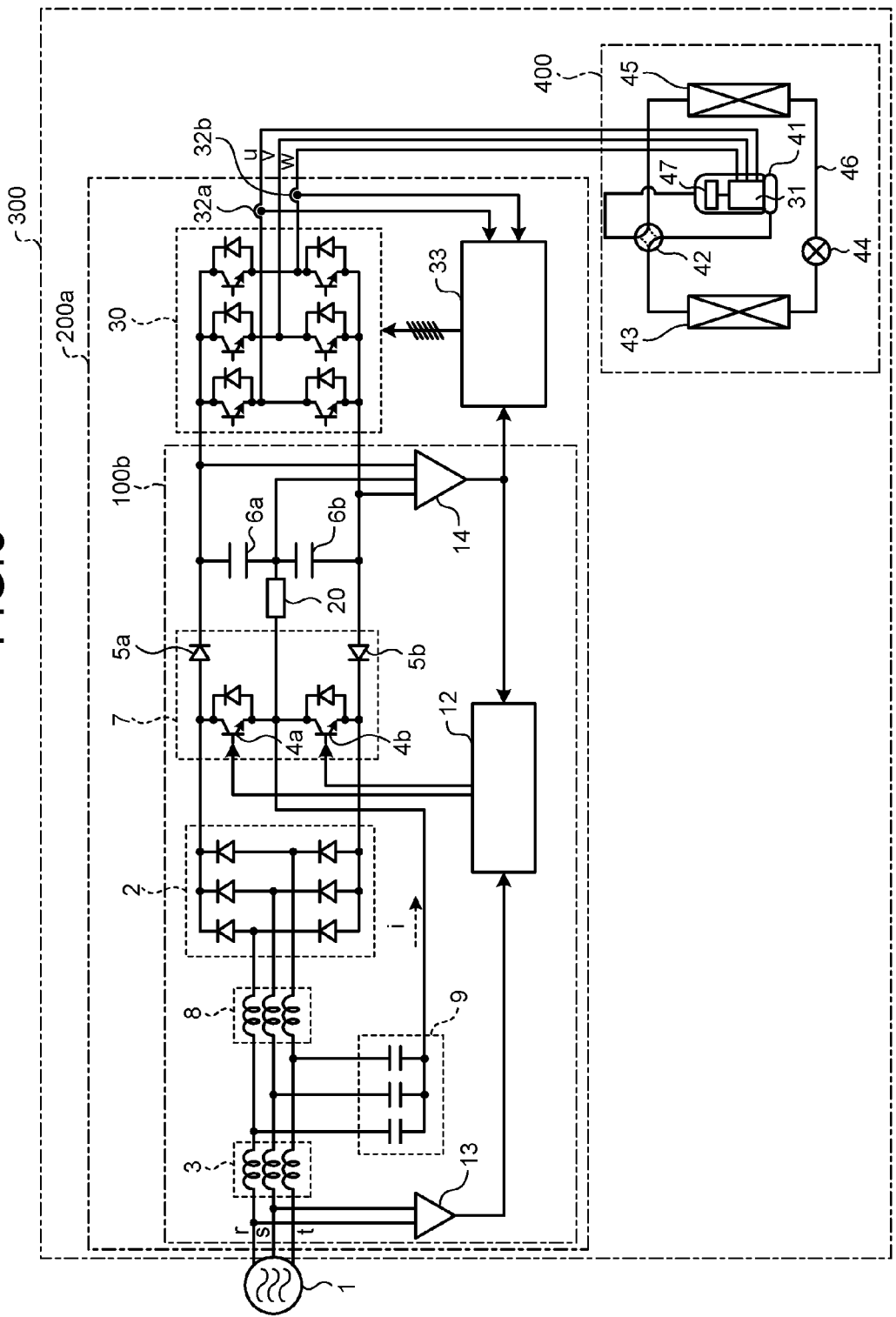
FIG. 8 is a diagram illustrating a configuration example of a refrigeration-cycle application device according to the fourth embodiment, to which an inverter that drives a motor of a compressor that constitutes a refrigeration-cycle device is connected as a load of the DC power-supply device.

FIG. 8 is a diagram illustrating a configuration example of a refrigeration-cycle application device according to the fourth embodiment, to which an inverter that drives a motor of a compressor that constitutes a refrigeration-cycle device is connected as a load of the DC power-supply device. The configuration of the DC power-supply device 100b illustrated in FIG. 8 is identical to that in the third embodiment, and therefore the descriptions thereof will be omitted. In a motor drive device 200a, its constituent elements that are identical to or equivalent to those in the motor drive device 200 illustrated in FIG. 7 are denoted by like reference signs, and the detailed descriptions thereof will be omitted.

In the example illustrated in FIG. 8, as a refrigeration-cycle application device 300, an air conditioner, a heat-pump water heater, a refrigerator, and a freezer are assumed, for example. The refrigeration-cycle application device 300 includes a refrigeration-cycle device 400, in which a compressor 41, a four-way valve 42, an outdoor heat exchanger 43, an expansion valve 44, and an indoor heat exchanger 45 are installed through a refrigerant pipe 46. Within the compressor 41, a compressor mechanism 47 that compresses a refrigerant, and the motor 31 that operates the compressor mechanism 47 are provided. A refrigerant circulates from the compressor 41 to between the outdoor heat exchanger 43 and the indoor heat exchanger 45 to perform cooling, heating, refrigerating, or the like.

In the case where the refrigeration-cycle application device 300 is an air conditioner, when the room temperature becomes close to the user's set temperature, the air conditioner is brought to a stable state. The control unit 33 controls the inverter 30 so as to rotate the motor 31 incorporated in the compressor 41 at a low speed. That is, in the air conditioner as described above, the low-speed rotation of the motor 31 is continued for the longest period of time. Therefore, efficiency improvement at the time of the low-speed operation most greatly contributes to energy saving. Accordingly, it is preferable to use the motor 31, in which the number of turns of the stator winding is increased, and the amount of current flow is relatively decreased.

Figure 9:
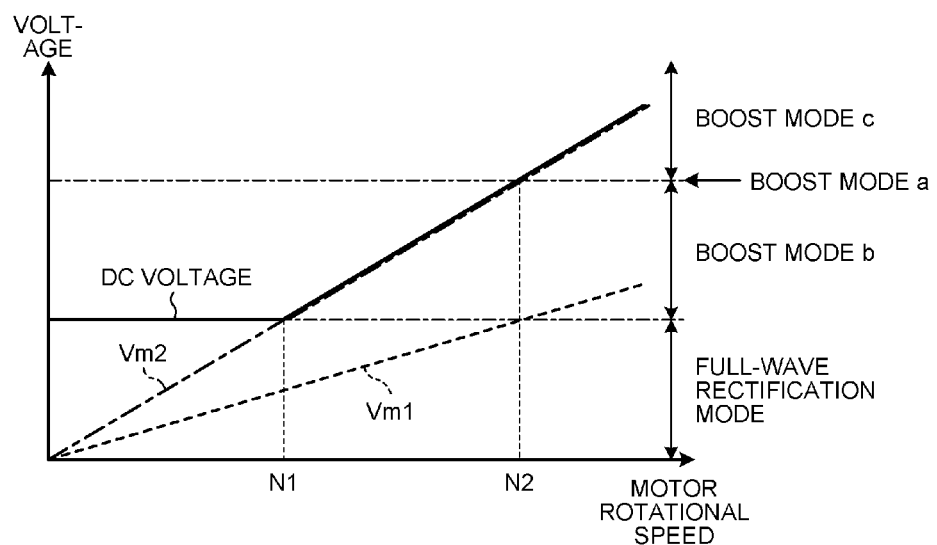
FIG. 9 is a diagram illustrating a relation between a motor rotational speed and a DC voltage in the motor drive device according to the fourth embodiment.

FIG. 9 is a diagram illustrating a relation between the motor rotational speed and the DC voltage in the motor drive device according to the fourth embodiment. Generally, the refrigeration-cycle application device 300 such as an air conditioner operates in such a manner as to enhance its capabilities when there is a large difference between the room temperature and the target temperature, in order that the room temperature immediately becomes close to the target temperature. At this time, the inverter 30 increases the rotational speed of the motor 31 to increase the flow rate of the refrigerant to be compressed by the compressor 41 to enhance the capabilities. The voltage value, required to drive the motor 31, increases in proportion to the rotational speed of the motor 31 as illustrated in FIG. 9. In the case of a motor with a smaller number of turns of the stator winding and a lower induced voltage, the voltage characteristics are represented as Vm1 (the dotted line illustrated in FIG. 9). In the case of a motor with a greater number of turns of the stator winding and a higher induced voltage, the voltage characteristics are represented as Vm2 (the dot-and-dash line illustrated in FIG. 9). In the case of using the motor with a higher induced voltage, as the voltage to be supplied from the inverter 30 is increased, it is possible to drive the motor at a lower current accordingly. This results in a lower loss in the inverter 30, and a highly-efficient operation is possible. However, in the case where the DC power-supply device 100b is operated in the full-wave rectification mode, the DC voltage is low, and therefore the maximum rotational speed, at which a highly-efficient operation is possible, is N1 as an upper-limit value. At the rotational speed equal to or higher than N1, the operation is still possible by using a flux weakening control. However, because the current is increased, the efficiency is degraded.

In the motor drive device 200a illustrated in FIG. 8, according to the increase in rotational speed of the motor 31, the DC power-supply device 100b is switched from the full-wave rectification mode in the range equal to or lower than the rotational speed N1, to the boost mode "b" or the boost mode "a" (the double-voltage mode) in the range from the rotational speed N1 to a rotational speed N2, to the boost mode "a" (the double-voltage mode) at the rotational speed N2, or to the boost mode "c" or the boost mode "a" (the double-voltage mode) in the range equal to or higher than the rotational speed N2, thereby boosting the DC voltage to be output to the inverter 30. This makes it possible to drive the motor 31 at a high speed and with high efficiency. In the range equal to or higher than the rotational speed N1, the motor 31 is operated at Vm2≅Vdc, and therefore the inverter 30 can be operated in a state of high modulation percentage. The number of switching pulses attributable to PWM is decreased. Accordingly, it is possible to achieve high efficiency due to a decrease in switching loss in the inverter 30, and a decrease in high-frequency iron loss in the motor 31. The DC power-supply device 100b is operated in the boost mode "c", and is thus capable of outputting a higher voltage to the inverter 30 than that of the boost mode "a" (the double-voltage mode). Consequently, the induced voltage is increased by increasing the number of turns of the stator winding in the motor 31, and high efficiency is achieved.

Further, in FIG. 8, the refrigeration-cycle device 400 is configured, in which a refrigerant circulates from the compressor 41 to between the heat exchangers 43 and 45 to perform cooling, heating, refrigerating, or the like. There are many types of refrigerant to be used in this refrigeration-cycle device 400. Depending on the composition of the refrigerant, it is referred to as "HCFC refrigerant" or "HFC refrigerant". The changeover from HCFC refrigerants with a higher ozone depletion potential to HFC refrigerants is being pushed forward worldwide.

On the other hand, because HFC refrigerants have a higher global warming potential (GWP), the regulation to reduce the usage amount of high-GWP refrigerants, the so-called European F-gas regulation, has been established as a part of the global warming countermeasures. In the future, the regulation such as to shift from HFC refrigerants to HFO refrigerants is going to be implemented.

Development of low-GWP HFO refrigerants has been already started, and is at the stage of consideration for the practical use. Examples of the refrigerant include R32 that is an HFC refrigerant, and R1234YF and R1123 that are HFO refrigerants. Among these refrigerants, particularly the HFO refrigerants such as R1234YF and R1123 are characterized by a very low GWP value that is equal to or less than 100. An HFO refrigerant has a low GWP because of its self decomposition in the atmosphere. On the other hand, because of its self decomposition in the atmosphere, this refrigerant is more likely to initiate a chemical reaction even when it is sealed within the refrigeration-cycle device 400. Since the HFO refrigerant is hermetically sealed, the pressure and the temperature tend to increase within the compressor 41. Under the worst conditions, the compressor 41 may rupture. Particularly, the low-GWP refrigerant as described above has slightly flammable properties or flammable properties, and has a problem with handling and commercialization. In the case where the refrigeration-cycle device 400 using this low-GWP refrigerant is operated by the inverter 30, not only the inverter 30 is required to control the refrigeration-cycle device 400 according to the low-GWP refrigerant, but also product protection is required for the inverter 30, which is different from the protection in the case of using a conventional HCFC refrigerant or the like.

Further, there needs to be an ignition source for a slightly-flammable refrigerant or a flammable refrigerant to ignite. The motor 31 incorporated in the compressor 41 can become the ignition source for the refrigerant sealed within the refrigeration-cycle device 400. The motor 31 is supplied with energy from the inverter 30. Therefore, an energy supply from the inverter 30 to the motor 31 is interrupted, thereby suppressing an increase in the refrigerant pressure and temperature, and suppressing the ignition source. This can improve the safety of the low-GWP refrigerant.

The operation of the inverter 30 when a low-GWP refrigerant is sealed within the refrigeration-cycle device 400 is described.

First, as described above, as a cause of the occurrence of chemical decomposition of the low-GWP refrigerant, an increase in the refrigerant pressure and temperature is considered. The refrigerant pressure can be estimated based on the output torque of the motor 31. Further, the refrigerant temperature can approximate to the magnet temperature inside the rotor of the motor 31, and therefore can be estimated by estimating the magnet temperature.

Next, estimation of the refrigerant temperature is described. In the configuration in which a permanent-magnet motor is used as the motor 31, the rotor comes in contact with the refrigerant, and accordingly the refrigerant temperature substantially matches the rotor temperature. Further, a permanent magnet has dependency on a temperature, and thus the magnetic-flux amount is changed depending on a temperature. By utilizing these magnet characteristics, the refrigerant temperature can be estimated. Specifically, the magnetic-flux amount of the permanent-magnet motor is expressed by the following equation (1).

[Equation 1]

$$\begin{bmatrix} Vd \\ Vq \end{bmatrix} = \begin{bmatrix} R+pLd & -\omega Lq \\ \omega Ld & R+pLq \end{bmatrix} \begin{bmatrix} id \\ iq \end{bmatrix} + \begin{bmatrix} 0 \\ \omega\phi \end{bmatrix} \qquad (1)$$

In the equation (1), "φ" is a value that represents the magnetic-flux amount in the permanent magnet, Vq represents a q-axis voltage, id represents a d-axis current, iq represents a q-axis current, "ω" represents a rotational speed, "R" represents a resistance, Ld represents a d-axis inductance, and Lq represents a q-axis inductance. Further, "p" represents a differential operator.

When the rotation is stable, the differential component is 0. Therefore, the magnetic-flux amount "φ" of the permanent magnet can be calculated from the q-axis current Vq, the d-axis current id, the q-axis current iq, the rotational speed "ω", the resistance "R", the d-axis inductance Ld, and the q-axis inductance Lq. It is also possible that this magnetic-flux amount "φ" of the permanent magnet is obtained by a method to estimate it by using an observer or the like, or to directly compute it, or by using any other method.

The value of "φ" estimated in the manner as described above is compared with the magnetic-flux amount measured in advance at a predetermined temperature, for example, at 25° C. assumed as a normal temperature, or at 125° C. assumed as a high temperature. Therefore, the magnet temperature can be estimated. It is also possible that in this temperature estimation, based on the magnetic-flux amount measured in advance, an approximate expression is created, or a data table is created. Any method can be used for this temperature estimation.

In the manner as described above, the magnet temperature is estimated from the magnetic-flux amount of the magnet, and therefore the refrigerant temperature that can substantially approximate to the magnet temperature can be estimated.

In the refrigeration-cycle device 400, the theoretical range of the temperature increase associated with the pressure increase within the compressor 41 can be identified. Accordingly, when the temperature becomes higher than the theoretical range, a low-GWP refrigerant may initiate a chemical reaction. Therefore, when the estimated refrigerant temperature becomes equal to or higher than a predetermined temperature, the refrigerant may initiate a chemical reaction. To handle with the reaction, the inverter 30 is operated so as to decrease the rotational speed of the motor 31 to suppress the workload in the compressor 41 and to suppress the temperature increase. Consequently, the chemical reaction, which has been a problem for low-GWP refrigerants, can be suppressed.

Next, estimation of the refrigerant pressure is described. Similarly, by utilizing refrigerant properties that the refrigerant pressure is increased in proportion to the output torque of the motor 31, the refrigerant pressure can be estimated. The output torque of the motor 31 is expressed by the following equation (2).

[Equation 2]

$$Tm = Pm \cdot (\varphi \cdot id + (Ld - Lq) \cdot id \cdot iq) \quad (2)$$

In the equation (2), Tm is a value that represents an output torque of the motor, and Pm represents the number of pairs of poles in the motor. Parameters other than those described above are identical to those in the equation (1).

As represented in the equation (2), the output torque Tm is proportional to the currents (the d-axis current id and the q-axis current iq) that flow through the motor 31. Therefore, the output torque Tm can be estimated from the current that flows through the motor 31. There is a fact that the relation between the output torque Tm and the refrigerant pressure under the service conditions, under which the compressor 41 is operated, has been identified at the designing of the compressor 41. Therefore, when the output torque Tm is uniquely determined, the refrigerant pressure within the refrigeration-cycle device 400 can be estimated.

The pressure condition, under which a low-GWP refrigerant initiates a chemical reaction, is higher than the pressure condition used. Therefore, in a state where the output torque is estimated, and this estimated output torque becomes equal to or higher than a predetermined output torque set in advance, the inverter 30 is operated so as to decrease the rotational speed of the motor 31. Due to this operation, the workload in the compressor 41 can be reduced, and the pressure increase can be suppressed. Further, when an abnormal pressure increase occurs, a current that flows through the motor 31 is abruptly increased. Therefore, the time rate of change of the current di/dt is measured, and then when di/dt becomes equal to or greater than a predetermined value, the rotational speed of the motor 31 is decreased, or the inverter 30 stops the power supply (stops operating). By executing the control as described above, a chemical reaction, which has been a problem for low-GWP refrigerants, can be suppressed.

As described above, the inverter 30 is also operated so as to suppress the increase in temperature and pressure of a low-GWP refrigerant beyond its service conditions. Therefore, the low-GWP refrigerant can be used safely, which can comply with the global warming countermeasures.

In the present embodiment, the method for suppressing a chemical reaction of a low-GWP refrigerant has been described. However, the suppression method is not limited to the method as described above. It is also possible that any method is used as long as it can estimate the refrigerant pressure and the refrigerant temperature. It is apparent that the same effects can be also obtained by executing the control as described above using the estimated refrigerant pressure and the refrigerant temperature.

The discharge pressure of a low-GWP refrigerant, to be output from the compressor 41, is assumed to be higher than an HCFC refrigerant such as R410A. Therefore, a high start-up torque is required when the motor 31 starts-up. In the present embodiment, as illustrated in FIG. 8, the DC power-supply device 100b is provided at the previous stage of the inverter 30. Therefore, in the case where the start-up torque is insufficient, the DC power-supply device 100b can boost the DC voltage to assist the torque. Accordingly, the occurrence of a start-up failure can be suppressed at a low loss, and the product reliability can be improved.

As described above, in the present embodiment, the refrigeration-cycle application device 300 that easily deals with low-GWP refrigerants can be obtained by providing the control unit with a function of estimating a phenomenon that causes a chemical reaction of the low-GWP refrigerant, without using any special configuration in the inverter 30 and the DC power-supply device 100b.

Further, as described in the third embodiment, in a case where a short-circuit fault has occurred in any of the first backflow prevention element 5a, the second backflow prevention element 5b, the first switching element 4a, and the second switching element 4b, the opening-closing unit 20 is controlled to be opened, and also the DC power-supply device 100b is operated in the full-wave rectification mode. Therefore, even when a short-circuit fault has occurred in any of the first backflow prevention element 5a, the second backflow prevention element 5b, the first switching element 4a, and the second switching element 4b, the DC power-supply device 100b is still capable of supplying power to the inverter 30 in a stable manner without causing voltage unbalance between the first capacitor 6a and the second capacitor 6b. The DC power-supply device 100b is also capable of continuing the operation without causing a stop of the inverter 30 and the motor 31 driven by the inverter 30.

There is a case where a fault has occurred in the DC power-supply device 100b, and then the opening-closing unit 20 is controlled to be opened to operate the DC power-supply device 100b in the full-wave rectification mode. In that case, when the rotational speed of the motor 31 is high, a flux weakening control is used, and therefore the operation is still possible. However, because the current is increased, the efficiency is degraded. Meanwhile, in the case where an air conditioner that performs cooling and heating by the refrigeration-cycle device 400 is defective and its operation is stopped in midsummer, for example, there is a great adverse effect on the human body, such as causing a risk for heatstroke. When the refrigeration-cycle application device 300 that is required to have high reliability, that is for example an air-conditioner in a server room, is defective and its operation is stopped, this may cause a fault in devices located in the server room. When the operation of a food freezer is stopped due to a fault, this may promote spoilage of the food stored in the freezer. In the present embodiment, even when a fault has occurred in the DC power-supply device 100b, it is still operated in the full-wave rectification mode to continue the operation of the refrigeration-cycle application device 300, although the efficiency is decreased. This can prevent the human body from being adversely affected, prevent a device fault, or prevent food spoilage. Therefore, it is possible to obtain a highly-reliable refrigeration-cycle application device 300. In the refrigeration-cycle application device 300 required to have high reliability as described above, when a fault has occurred in the DC power-supply device 100b, the opening-closing unit 20 is controlled to be opened to operate the DC power-supply device 100b in the full-wave rectification mode to perform the emergency operation. Additionally, it is preferable to notify a user of the fault by means of an alarm or the like. With the operation as described above, it is possible to immediately manage the fault, and the recovery time can be reduced.

As a power-supply voltage of the AC power supply 1 that is a power supply of the DC power-supply device 100, there are various power-supply voltages such as 200 V and 400 V. Therefore, when the motor 31 is designed according to the power-supply situation for each destination, there are multiple types of motor specifications. This increases the evaluation workload and development workload of the motor 31. For example, when the power-supply voltage of the AC power supply 1 is 200 V, the DC power-supply device 100 described in the first embodiment is operated in the boost mode "a" (the double-voltage mode). When the power-supply voltage of the AC power supply 1 is 400 V, the DC power-supply device 100 is operated in the full-wave rectification mode. Therefore, the value of DC voltage becomes equal when the power-supply voltage of the AC power supply 1 is 200 V, and when the power-supply voltage of the AC power supply 1 is 400 V. Therefore, it is possible to drive the motor 31 with the same motor specifications. Further, also in the case where the power-supply voltage of the AC power supply 1 is 400 V, and where the DC power-supply device 100 is operated in the full-wave rectification mode, when the power-supply voltage is varied, the DC voltage is varied. For example, in the case where the DC power-supply device 100 is operated in the full-wave rectification mode, when the DC voltage becomes lower than the estimated value, this DC voltage is boosted by using the boost mode "b". This makes it possible to reduce the influence of the variations in the power-supply voltage. Accordingly, it is possible to operate the inverter 30 at a constant voltage.

In the examples in FIGS. 7 and 8, the configuration is illustrated, in which the DC power-supply device 100 or 100b in FIG. 1 or FIG. 6 described in the first or third embodiment is used. However, apparently, it is permissible to use the DC power-supply device 100a in FIG. 5 described in the second embodiment.

As described above, according to the motor drive device and the refrigeration-cycle application device of the fourth embodiment, by employing a configuration using the DC power-supply device described in the first to third embodiments, effects obtained by the DC power-supply device described in the first to third embodiments can be achieved.

According to the increase in motor rotational speed, the operating mode is shifted between the full-wave rectification mode, the boost mode "b", the boost mode "a" (the double-voltage mode), and the boost mode "c". Therefore, the output voltage to the inverter, thus the output voltage to the motor, can be increased. By increasing the number of turns of the stator winding in the motor, the output torque of the motor can be increased without increasing each phase-current to be output by the inverter, that is, without increasing a copper loss in the motor and a conduction loss in the inverter. This can contribute to high efficiency.

In the case where the number of turns of the stator winding in the motor is not increased, the output voltage to the inverter, thus the output voltage to the motor, is boosted, thereby increasing each phase-current to be output by the inverter. However, in this case, the output torque of the motor can be increased without increasing the size of the motor. This can contribute to downsizing of the motor.

Further, the output voltage to the motor is boosted, and the number of turns of the stator winding in the motor is increased, so that the output torque of the motor can be increased, and also the efficiency and the demagnetization resistance can be improved. Therefore, this facilitates use of a motor using a ferrite magnet that has increased availability and is less costly as compared to a rare-earth magnet.

Because it is possible to deal with different power-supply voltages without changing the motor specifications, the evaluation workload and the development workload of the motor can be reduced.

In the above embodiments, there has been described the example of application to the configuration in which a three-phase alternating current is supplied from an AC power supply. However, it is still possible to apply the present invention to a configuration in which a single-phase alternating current, a two-phase alternating current, or a four-phase or more multiphase alternating current is supplied. It is apparent that the effects identical to those in the above embodiments can be also obtained.

In the above embodiments, as the first switching element and the second switching element, and the first backflow prevention element and the second backflow prevention element, it is common to use a Si-based semiconductor generally made of a silicon (Si) material. However, apparently it is also possible to use a wide bandgap (WBG) semiconductor made of a material such as silicon carbide (SiC), gallium nitride (GaN), or diamond.

A switching element and a backflow prevention element, formed of the WBG semiconductor as described above, have a high voltage resistance and a high allowable current density. Therefore, it is possible to downsize the switching element and the backflow prevention element. Using these downsized switching element and backflow prevention element also makes it possible to downsize a DC power-supply device and a motor drive device that are configured using these elements.

Further, the switching element and the backflow prevention element, formed of the WBG semiconductor as described above, have a high heat resistance. Therefore, it is possible to downsize a radiation fin of a heat sink, and to air-cool a water-cooled portion. Accordingly, it is possible to further downsize the DC power-supply device.

Furthermore, the switching element and the backflow prevention element, formed of the WBG semiconductor as described above, have a low power loss. Therefore, it is possible to achieve high efficiency in the switching element and the backflow prevention element. Accordingly, it is possible to achieve high efficiency in the DC power-supply device and the motor drive device.

While it is desirable to form both of the switching element and the backflow prevention element from the WBG semiconductor, it is also permissible that either one of them is formed of the WBG semiconductor. It is still possible to obtain the effects described above.

Furthermore, it is also possible that each switching unit that constitutes the inverter is formed of the WBG semiconductor. It is apparent that due to this configuration, even higher efficiency in the DC power-supply device and the motor drive device can be achieved.

In the above embodiments, examples of the switching element include a power transistor, a power MOSFET, and an IGBT. Also, as examples of the switching element, there are a metal-oxide-semiconductor field-effect transistor (MOSFET) with a super junction structure, known as a highly-efficient switching element having a deeper P-layer than normal MOSFETs, in which the deeper P-layer widely contacts with an n-layer, thereby having a high voltage resistance, while having a low on-resistance, as well as an insulated-gate semiconductor device, a bipolar transistor, and the like. Even when these switching elements are used, it is still possible to provide a highly-efficient DC power-supply device and a highly-efficient motor drive device that are capable of obtaining effects identical to those in the above embodiments, and can achieve an even lower power loss.

It is possible for each of a control unit of the DC power-supply device and a control unit of the inverter to be configured by a discrete system such as a central processing unit (CPU), a digital signal processor (DSP), or a microcomputer. Other than those mentioned above, it is also possible that each of these control units is configured by electric-circuit elements in an analog circuit, a digital circuit, or the like. Furthermore, it is also possible that the control unit of the DC power-supply device, and the control unit of the inverter are configured on the same package. It is apparent that the present invention is not limited by the configuration of these control units.

The configurations described in the above embodiments are only examples of the configuration of the present invention. The configurations can be combined with other publicly known techniques, and can be modified without departing from the scope of the present invention, such as omitting a part of the configurations.

INDUSTRIAL APPLICABILITY

As described above, the present invention is useful as a technique that can achieve high efficiency, improve the power factor of the power supply, and decrease a harmonic current in a DC power-supply device that converts an alternating current supplied from an AC power supply to a direct current, and that supplies the direct current to a load. Particularly, in a refrigeration-cycle application device including a refrigeration-cycle device, such as an air conditioner, a freezer, a washer-dryer, a refrigerator, a dehumidifier, a heat-pump water heater, or a refrigerated showcase, the present invention is suitable for the configuration in which the inverter converts the output voltage of the DC power-supply device to an AC voltage to drive a motor of a compressor that constitutes the refrigeration-cycle device. Other than this configuration, it is also possible to apply the present invention to a fan motor, a ventilation fan, a hand drier, an induction-heating electromagnetic cooker, and the like.

The invention claimed is:

1. A DC power-supply device that converts an alternating current supplied from an AC power supply to a direct current, and that supplies the direct current to a load, the DC power-supply device comprising:
   a rectifying circuit that rectifies the alternating current;
   a first reactor that is inserted between the AC power supply and the rectifying circuit for each phase;
   a first capacitor group that is provided with a first capacitor and a second capacitor connected in series to each other, and that is connected between output terminals to the load;
   a switching element group that is provided with a first switching element and a second switching element connected in series to each other, and that is connected in parallel to between the rectifying circuit and the first capacitor group;
   a backflow prevention unit that prevents a backflow of electric charge to the switching element group, where the electric charge is stored in the first capacitor group by an operation of the switching element group;
   a second capacitor group that is provided with three capacitors, in each of which one end is electrically connected to a midpoint of the switching element group, and the other end is connected to each phase-terminal of the first reactor on a side of the rectifying circuit; and
   a second reactor in which one end is connected to a connection point of the first reactor and the second capacitor group, and the other end is connected to the rectifying circuit, wherein
   the DC power-supply device boosts an output voltage to the load, while controlling an on-duty of the first switching element, and an on-duty of the second switching element to be equal to each other, and
   an inductance value of the second reactor is smaller than an inductance value of the first reactor.

2. The DC power-supply device according to claim 1, wherein the DC power-supply device has
   a full-wave rectification mode in which the first switching element and the second switching element are controlled to an off state, and
   a boost mode in which the first switching element and the second switching element are controlled to be on alternately.

3. The DC power-supply device according to claim 2, wherein in the boost mode, when a voltage of an alternating current supplied from the AC power supply is equal to or higher than a threshold value, the on-duty is less than 50%, and an interval is set during which the first switching element and the second switching element are turned off simultaneously.

4. The DC power-supply device according to claim 2, wherein in the boost mode, when a voltage of an alternating current supplied from the AC power supply is lower than a threshold value, the on-duty is equal to or greater than 50%, and an interval is set during which the first switching element and the second switching element are turned on simultaneously.

5. The DC power-supply device according to claim 2, further comprising an opening-closing unit that is connected between a midpoint of the switching element group and a midpoint of the first capacitor group.

6. The DC power-supply device according to claim 5, wherein when a short-circuit fault has occurred in any of the backflow prevention unit, the first switching element, and the second switching element, the opening-closing unit is controlled to be opened to operate the DC power-supply device in the full-wave rectification mode.

7. The DC power-supply device according to claim 1, wherein the first reactor and the second reactor are configured as a single magnetically-coupled reactor in which different core materials are magnetically coupled together.

8. The DC power-supply device according to claim 1, wherein at least one of the first switching element, the second switching element, and a semiconductor element constituting the backflow prevention unit is formed of a wide bandgap semiconductor.

9. The DC power-supply device according to claim 8, wherein the wide bandgap semiconductor is made of silicon carbide, a gallium nitride material, or diamond.

10. A motor drive device comprising the DC power-supply device according to claim 1, wherein
the motor drive device includes an inverter that drives a motor as the load.

* * * * *